United States Patent
Nishimura

(10) Patent No.: US 7,318,747 B2
(45) Date of Patent: Jan. 15, 2008

(54) BOARD MOUNTING STRUCTURE

(75) Inventor: Seiichi Nishimura, Aichi-ken (JP)

(73) Assignee: Kojima Press Industry Co., Ltd. (JP)

( * ) Notice: Subject to any disclaimer, the term of this patent is extended or adjusted under 35 U.S.C. 154(b) by 0 days.

(21) Appl. No.: 11/787,542

(22) Filed: Apr. 16, 2007

(65) Prior Publication Data

US 2007/0243765 A1 Oct. 18, 2007

(30) Foreign Application Priority Data

Apr. 18, 2006 (JP) .............................. 2006-114970

(51) Int. Cl.
*H01R 13/73* (2006.01)
(52) U.S. Cl. .................... 439/546; 439/34; 439/57; 439/547
(58) Field of Classification Search ............... 439/546, 439/547, 57, 34, 554, 558
See application file for complete search history.

(56) References Cited

U.S. PATENT DOCUMENTS

| | | | | | |
|---|---|---|---|---|---|
| 2,110,136 | A | * | 3/1938 | Douglas | 403/24 |
| 3,047,829 | A | * | 7/1962 | Mouat | 362/549 |
| 4,762,451 | A | * | 8/1988 | Collins | 411/177 |
| 5,513,082 | A | * | 4/1996 | Asano | 362/656 |
| 2001/0016431 | A1 | * | 8/2001 | Sawayanagi et al. | 439/34 |

FOREIGN PATENT DOCUMENTS

JP 61-158988 10/1986
JP 4262365 9/1992

* cited by examiner

*Primary Examiner*—Hien Vu
(74) *Attorney, Agent, or Firm*—Ganz Law, P.C.

(57) ABSTRACT

A board is easily and securely mounted on a panel. Projecting parts are formed on the panel, and arc open grooves which are inserted onto the projecting parts are formed in a bulb board. The open grooves of the bulb board each are inserted onto the projecting parts, then the bulb board is turned within the surface of the panel to lock the bulb board to the panel by bringing the bottom surfaces of the bent parts formed at the ends of the projecting parts into contact with the surface of the bulb board. A stopper rib is formed on the panel to prevent the bulb board from turning backward, thereby preventing the board from being separated from the panel.

3 Claims, 5 Drawing Sheets

BOARD MOUNTING STRUCTURE

PRIORITY INFORMATION

This application claims priority to Japanese Patent Application No. 2006-114970 filed on Apr. 18, 2006, which is incorporated herein by reference in its entirety.

BACKGROUND OF THE INVENTION

1. Technical Field

The present invention relates to a mounting structure for mounting a board on a panel.

2. Related Art

Conventionally, fixing with screws, and fitting and fixing with pawls are known as methods of mounting a board of parts such as a heater control device, an overhead module or the like on a panel.

Japanese Utility Model Application Laid-Open Publication No. Sho 61-158988 discloses a technique of fixing with screws. Japanese Patent Laid-Open Publication No. Hei 4-262365 discloses a technique of mounting a bulb. Specifically, it discloses a lamp for a panel that a socket part of a socket body is fitted into and mounted in a mounting hole of a printed circuit board, wherein a pair of engaging pieces is mounted on the side of the socket part, a slope which inclines at a prescribed angle with respect to the socket body is formed on the engaging pieces, and the slopes of the engaging pieces are engaged with the opening edge of the mounting hole to lock the socket part when the socket part is inserted through the mounting hole of the printed circuit board.

However, when the fixing with screws is employed, a cost is increased by the screw unit cost. Also, the number of man-hours is increased by the screwing step, resulting in an increase in total mounting time.

When the fitting and fixing with pawls such as engaging pieces is employed, there is a possibility that the board will be separated from the panel because the pawls are bent to break or deform. There is also a possibility that the board will be separated from the panel because of a bad fit.

SUMMARY OF THE INVENTION

The present invention provides a structure with which a board can be reliably and easily mounted on a panel without screwing and involving a bad fit.

The present invention provides a mounting structure for mounting a parts-mounting board on a panel. The panel has on its mounting surface a first projecting part and a second projecting part which are separated by a prescribed distance, and the first projecting part and the second projecting part each have a bent part at their leading ends. The board has a first open groove at a position opposite to the first projecting part and a second open groove at a position opposite to the second projecting part, the first open groove and the second open groove each have an arc shape with a common center and a broad portion at an end portion of the arc shape, and the broad portions are inserted onto the first projecting part and the second projecting part. After the first open groove and the second open groove are each inserted onto the first projecting part and the second projecting part, the board is turned about the common center within the mounting surface to make the bottom surfaces of the bent parts of the first projecting part and the second projecting part come into contact with the surface of the board to mount the board onto the panel.

According to one embodiment of the present invention, the panel has a stopper for restricting the board from turning backward. Also, the rides up on the stopper while it is being turned and goes over the stopper when the turning is completed, and the board is allowed to incline when the board is on the stopper because the bottom surfaces of the bent parts of the first projecting part and the second projecting part are tapered.

BRIEF DESCRIPTION OF THE DRAWINGS

Preferred embodiments of the present invention will be described in detail based on the following figures, wherein.

DESCRIPTION OF THE PREFERRED EMBODIMENT

An embodiment of the present invention will be described with reference to the accompanying drawings.

Figure 1:
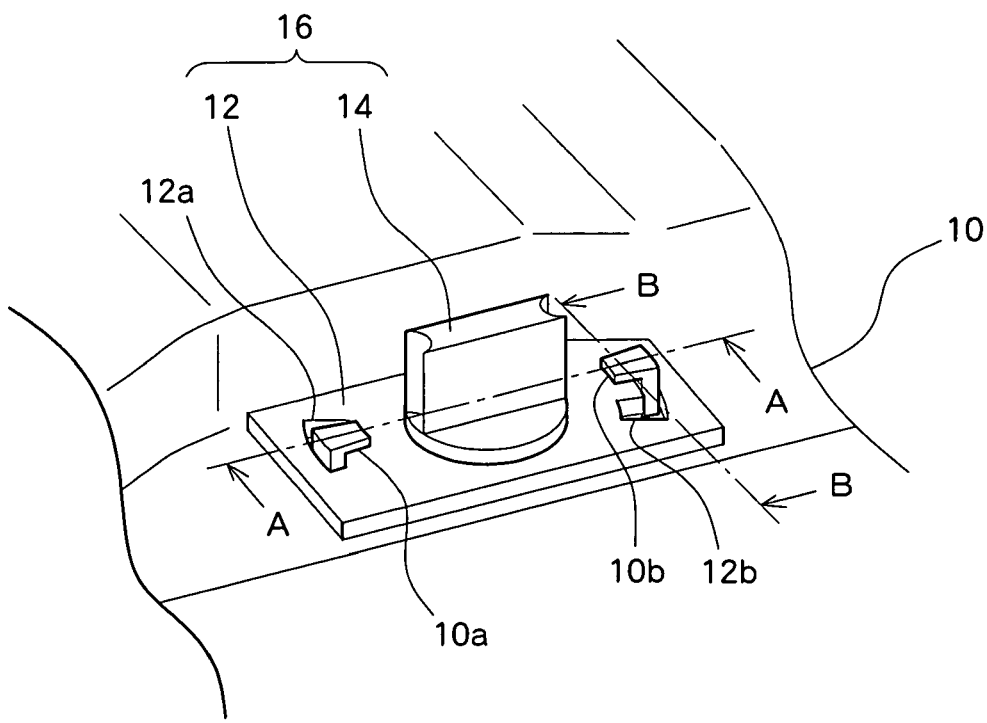
FIG. 1 is a perspective view showing a board-mounted state according to an embodiment.
Figure 2:
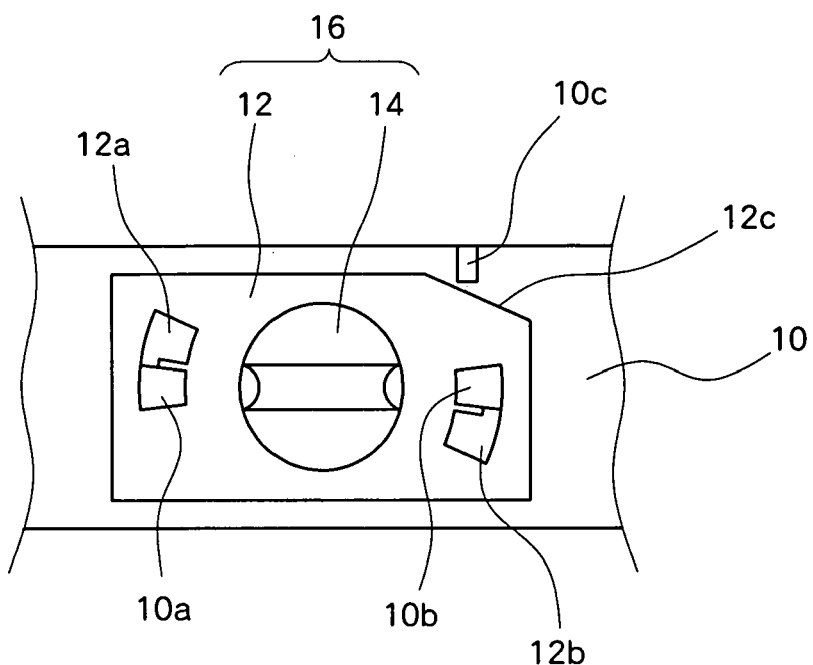
FIG. 2 is a plan view showing the board-mounted state according to the embodiment.

FIG. 1 shows a perspective view of a state where a board is mounted on a panel according to the embodiment. FIG. 2 shows a plan view of the state where the board is mounted on the panel.

A bulb board 12 has a bulb 14 as an electrical part. The bulb board 12 and the bulb 14 configure a sub-assembly (semi-manufactured product) 16. The bulb board 12 has a rectangular planar shape, and two open grooves 12a and 12b are formed along a longitudinal direction. Two projecting parts 10a and 10b are erected on a panel 10, the open groove 12a is inserted onto the projecting part 10a, and the open groove 12b is inserted onto the projecting part 10b. The projecting parts 10a and 10b serve as pawl parts and they are engaged with the open grooves 12a and 12b to lock the bulb board 12. As described later, the open grooves 10a and 10b each have an arc shape with a common center and a broad portion at one end. The open grooves 12a and 12b have their broad portions fitted onto the projecting parts 10a and 10b. After the insertion, the bulb board 12 is turned clockwise as shown in the plan view of FIG. 2 to engage narrow portions of the open grooves 12a and 12b with the projecting parts 10a and 10b. In addition to the projecting parts 10a, 10b, a stopper rib 10c is formed on the panel 10. The stopper rib 10c is disposed to be positioned near the bulb board 12 when the bulb board 12 is mounted on the panel 10 and restricts the bulb board 12 from turning in a direction opposite to its turning when it is mounted, namely turning counterclockwise, thereby preventing the bulb board 12 from separating from the panel 10. A cutaway section (or a taper) 12c is formed on the bulb board 12 at a portion opposite to the stopper rib 10c to avoid interference between the bulb board 12 and the stopper rib 10c in the mounted state and to restrict the bulb board 12 from turning backward by the interference between the bulb board 12 and the stopper rib 10c when the bulb board 12 is turned backward.

Figure 3:
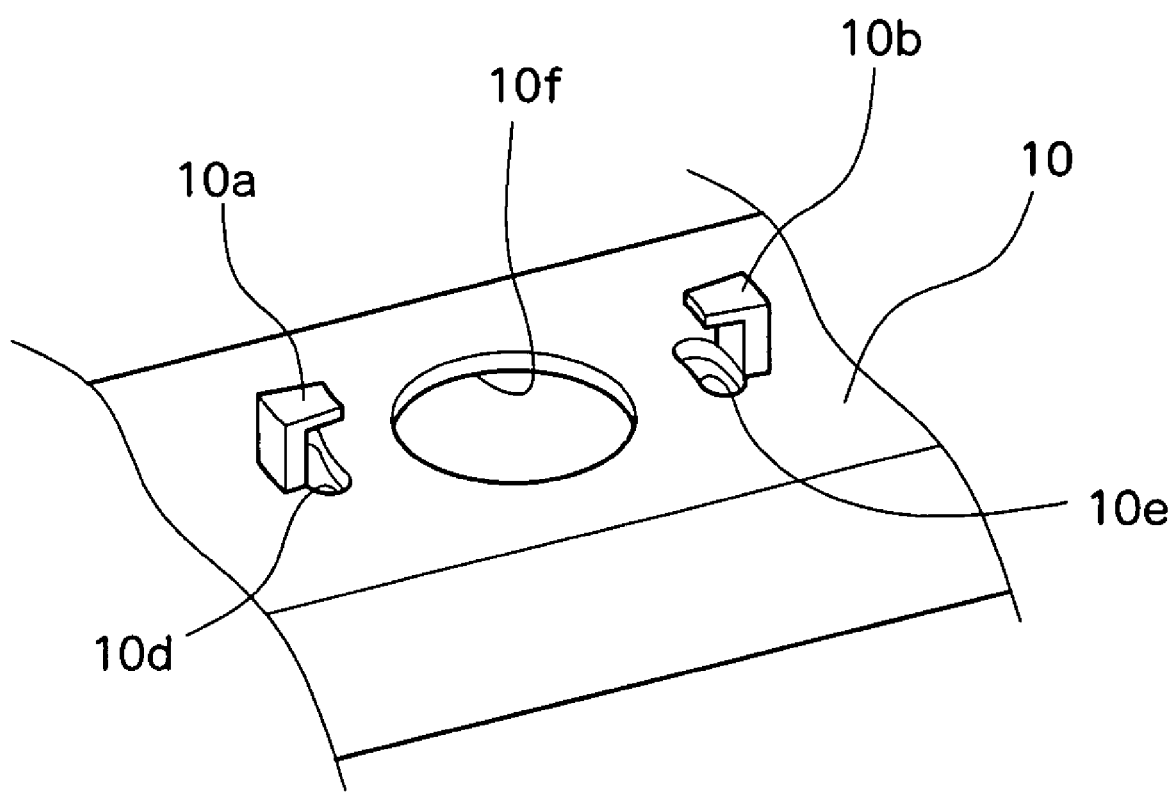
FIG. 3 is a perspective view of a panel.

FIG. 3 shows a main portion of the panel 10 with the sub-assembly 16 removed from the mounted state shown in FIG. 1. As described above, the projecting parts 10a and 10b are erected on the panel 10. The projecting parts 10a and 10b are formed apart from each other by a prescribed distance and have a bent part on the leading ends. The bent part of the projecting part 10a extends toward the projecting part 10b in parallel to the board mounted surface of the panel 10. The bent part of the projecting part 10b also extends toward the projecting part 10a in parallel to the board mounted surface of the panel 10. Therefore, the bent part of the projecting part 10a and the bent part of the projecting part 10b face each other. A vertical cross-sectional shape of the projecting parts 10a, 10b is an inverted L shape. A distance between the board mounting surface of the panel 10 and the bent parts of the projecting parts 10a, 10b is set to be substantially equal to the thickness of the bulb board 12. In a state where the bulb board 12 is mounted on the panel 10, the surface of the bulb board 12 is in contact with the bottom surfaces of the bent parts of the projecting parts 10a, 10b, and the bulb board 12 is locked with the bent parts of the projecting parts 10a, 10b. Openings 10d, 10e are formed near the projecting parts 10a, 10b of the panel 10. An opening 10f is formed between the projecting parts 10a, 10b. Where the bulb board 12 is mounted, the bulb 14 is inserted into the opening 10f.

Figure 4A:
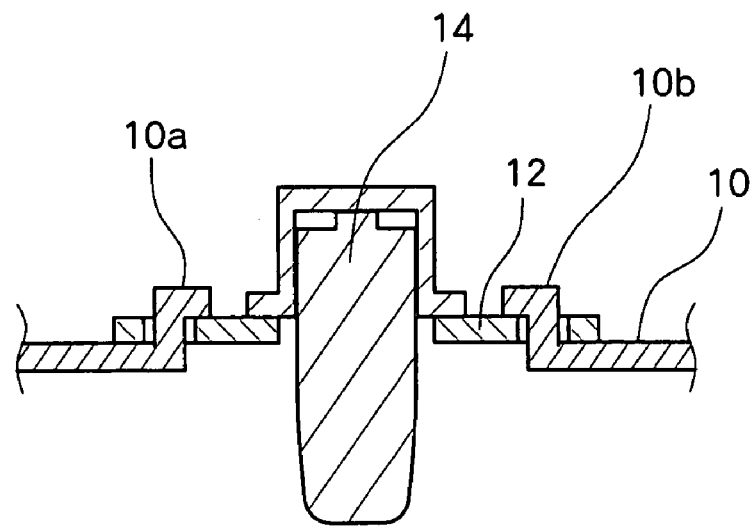
FIG. 4A is a sectional view taken along line A-A in FIG. 1.
Figure 4B:
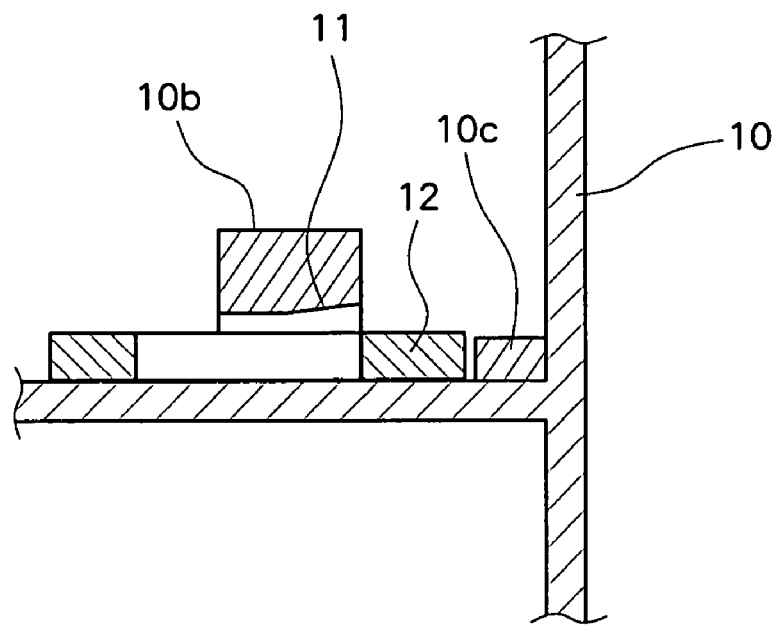
FIG. 4B is a sectional view taken along line B-B in FIG. 1.

FIG. 4A shows a sectional view taken alone line A-A in FIG. 1, and FIG. 4B shows a sectional view taken along line B-B in FIG. 1. As shown in FIG. 4A, the projecting parts 10a, 10b formed on the panel 10 have an inverted L shape, and the bottom surfaces of their bent parts come into contact with the surface of the bulb board 12. The bulb 14 is inserted into the opening 10f of the panel 10. The narrow portion of the arc open groove 12a of the bulb board 12 is set to a width substantially equal to that of the projecting part 10a. Similarly, the narrow portion of the arc open groove 12b of the bulb board 12 is set to a width substantially equal to that of the projecting part 10b. Thus, the bulb board 12 in the mounted state is prevented from becoming loose. As shown in FIG. 4B, the stopper rib 10c is present near the bulb board 12 in the mounted state, thereby preventing the bulb board 12 from turning backward. A taper 11 is formed on the bottom surfaces of the bent parts of the projecting parts 10a and 10b. The taper 11 allows the bulb board 12 to incline.

A method of mounting the sub-assembly 16 which is comprised of the bulb board 12 and the bulb 14 on the panel 10 will be described in detail below.

Figure 5A:
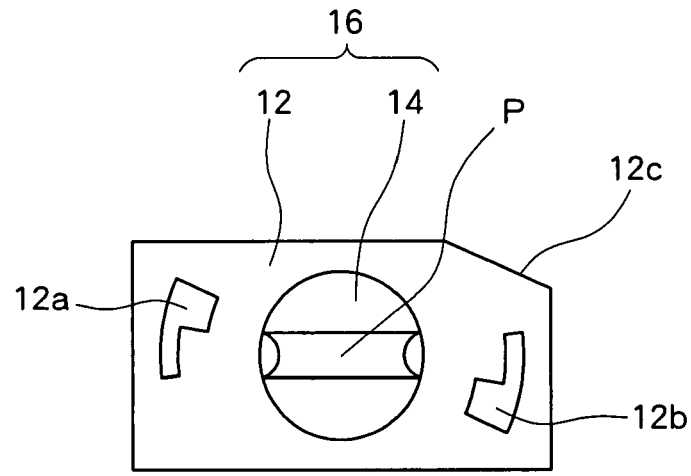
FIG. 5A is an explanatory view (insertion of a board) showing a board-mounting method according to the embodiment.
Figure 5A:
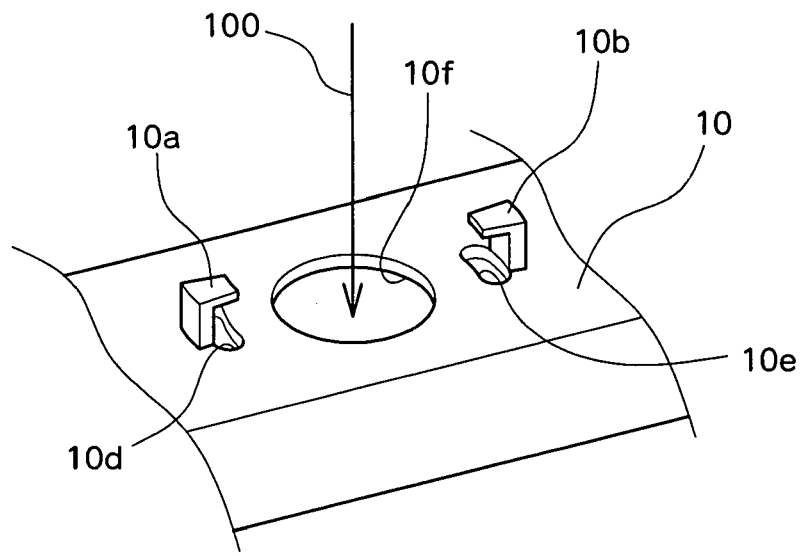
Figure 5B:
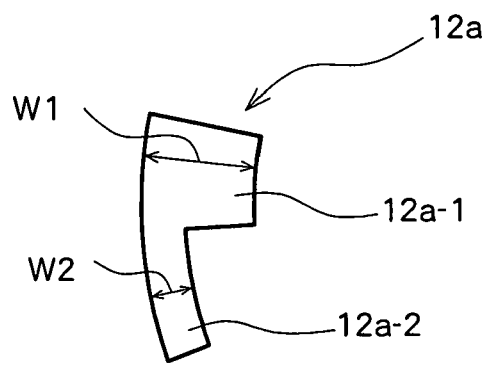
FIG. 5B is an enlarged view of an open groove.

FIG. 5A shows a structure of the sub-assembly 16 and the panel 10 being mounted. The bulb 14 is mounted at substantially the center of the bulb board 12, and the arc open grooves 12a and 12b are formed at both ends of the bulb board 12 with the bulb 14 between them. The arc centers of the open grooves 12a, 12b are substantially equal to a center of gravity P of the bulb board 12. FIG. 5B shows an enlarged view of the open groove 12a. The open groove 12a has a broad portion 12a-1 at its one end and a narrow portion 12a-2 at the other end or the rest of the groove. Width W1 of the broad portion 12a-1 is formed to be not smaller than that of the bent part of the projecting part 10a, and the broad portion 12a-1 of the open groove 12a can be fitted onto the projecting part 10a. The narrow portion 12a-2 forms an arc-shaped main portion, and its width W2 is substantially equal to that (width of the erected portion) of the projecting part 10a. The same also applies to the open groove 12b. The open grooves 12a, 12b of the bulb board 12 are aligned to face the projecting parts 10a, 10b, the bulb 14 is aligned with the opening 10f and inserted into the opening 10f as indicated by an arrow 100 in the figure, the open groove 12a is inserted onto the projecting part 10a, and the open groove 12b is inserted onto the projecting part 10b.

Figure 6:
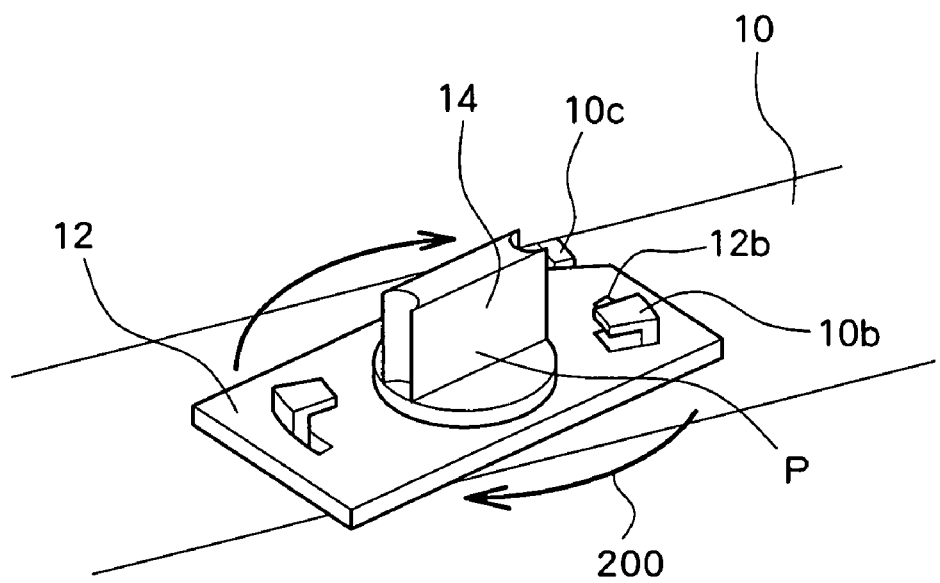
FIG. 6 is an explanatory view (turning of the board) showing the board mounting method according to the embodiment.

FIG. 6 shows a state where the bulb 14 is inserted into the opening 10f, and the open grooves 12a, 12b are fitted onto the projecting parts 10a, 10b. The bulb board 12 in the shown state is turned in the direction indicated by an arrow 200, namely a clockwise direction, about the center of gravity P of the bulb board 12. At this time, the bulb 14 may be held to turn the bulb board 12. When the bulb board 12 is turned, the open groove 12a which is fitted onto the projecting part 10a is also turned, and the projecting part 10a is relatively slid along the arc groove of the open groove 12a to move from the broad portion 12a-1 to the narrow portion 12a-2 of the open groove 12a and serves to lock at the end position of the narrow portion 12a-2. Similarly, when the bulb board 12 is turned, the open groove 12b which is inserted onto the projecting part 10b is also turned, and the projecting part 10b is relatively slid along the arc groove of the open groove 12b to move from the broad portion to the narrow portion of the open groove 12b and serves to lock at the end position of the narrow portion. At this time, the surface of the bulb board 12 and the bottom surface of the bent part of the projecting part 10a are brought into contact, the surface of the bulb board 12 and the bottom surface of the bent part of the projecting part 10b are brought into contact, and the bent parts of the projecting parts 10a, 10b serve as pawls to lock the bulb board 12, namely the sub-assembly 16. The bulb board 12 is prevented from being turned clockwise furthermore by the open grooves 12a, 12b, and the bulb board 12 is prevented from turning counter-clockwise by the stopper rib 10c. Sliding or loosening of the bulb board 12 on the surface of the panel 10 is prevented by engagement or fitting of the open grooves 12a, 12b and the projecting parts 10a, 10b. Also, the bulb board 12 is prevented from moving in a vertical direction on the surface of the panel 10 by the bent parts of the projecting parts 10a, 10b. Thus, the sub-assembly 16 is completely mounted on the panel 10.

When mounting, more specifically, when the open grooves 12a, 12b are respectively inserted onto the projecting parts 10a, 10b and the bulb board 12 is turned clockwise about the center of gravity P, the bulb board 12 rides up on the stopper rib 10c to incline because the stopper rib 10c is formed on the panel 10. Accordingly, the bottom surfaces of the bent parts of the projecting parts 10a, 10b are provided with the taper 11 for prevention of interference with the inclined bulb board 12 as described above.

Figure 7:
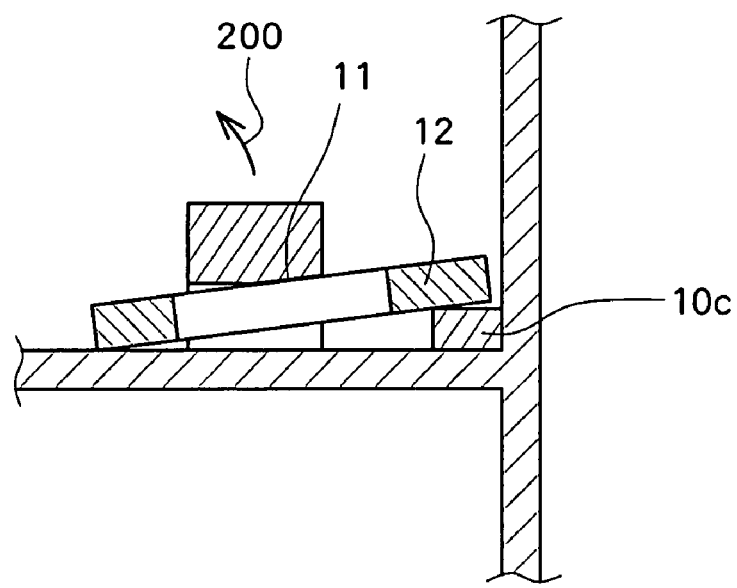
FIG. 7 is a sectional view showing a state of riding up on a stopper rib when mounted according to the embodiment.

FIG. 7 is a sectional view showing a state where the bulb board 12 is inclined when the bulb board 12 is turned clockwise to ride up on the stopper rib 10c when it is mounted. The surface of the bulb board 12 and the bottom surface of the bent part of the projecting part 10b are brought into contact, so that if the bottom surface of the bent part is flat, the inclination of the bulb board 12 causes interference between the bulb board 12 and the bent part, and the bulb board 12 cannot be turned. Therefore, the bottom surface of the bent part of the projecting part 10b is not formed flat but provided with the taper 11 which inclines upward toward the stopper rib 10c. Thus, even if the bulb board 12 rides up on the stopper rib 10c to incline, the projecting part 10b is somewhat bent in the direction indicated by the arrow 200 to allow the bulb board 12 to turn, so that the bulb board 12 can be turned over the stopper rib 10c to the locked position and mounted on the panel 10. A cutaway section 1 (or a taper) 12c is formed on a part of the bulb board 12 corresponding to the stopper rib 10c as shown in FIG. 2, and when the bulb board 12 is completely turned and mounted, the bulb board 12 does not interfere with the stopper rib 10c, and the bulb board 12 does not ride up on the stopper rib 10c. The taper 11 is formed on the bottom surface of the bent part of the projecting part 10b, but the portion other than the taper 11 on the bottom surface of the bent part is flat and in contact with the surface of the bulb board 12 to lock the bulb board 12.

According to this embodiment, by sufficiently extending the bent parts of the projecting parts 10a, 10b, the bulb board 12 can be kept in the inserted state or fitted state even if the projecting parts 10a, 10b are somewhat bent. The bent parts of the projecting parts 10a, 10b serve as an engagement allowance or fitting allowance between the bulb board 12 and the projecting parts 10a, 10b. According to this embodiment, the bulb board 12 is basically mounted on the panel 10 and fixed with the pawls, but the bulb board 12 is mounted by turning on the surface of the panel 10. Therefore, it is necessary to turn the bulb board 12 backward to remove the bulb board 12 from the panel 10, but the turning backward is prevented by the stopper rib 10c, so that the fitting is not disengaged.

According to this embodiment, the bulb 14 is exemplified as an electrical part, but it may be any electrical part such as a heater control device, an overhead module or the like. The bulb board 12 is mounted by turning about the center of gravity P of the bulb board 12 according to this embodiment, but it is preferable to dispose the bulb 14 near the center of gravity P of the bulb board 12. In other words, a part such as the bulb 14 is suitably disposed near the turning center of a board such as the bulb board 12 to decrease a moving distance of the part when it is mounted and to avoid it interfering with other members.

According to this embodiment, the bent part of the projecting part 10a is extended toward the projecting part 10b, and the bent part of the projecting part 10b is extended toward the projecting part 10a, but the bent part of the projecting part 10a may be extended in the direction opposite to that of the projecting part 10b, and the bent part of the projecting part 10b may be extended in the direction opposite to that of the projecting part 10a.

According to this embodiment, the projecting parts 10a, 10b are formed in the same straight line within the board-mounted surface of the panel 10, but three projecting parts may be formed at points which are mutually separated by an angle of 120 degrees with a certain point as a center. In this case, the bulb board 12 may be provided with three open grooves. In other words, it is sufficient to form at least two projecting parts and open grooves.

What is claimed is:

1. A board mounting structure, comprising:

a panel, and a board having an opening to receive an electrical part and having parts which is to be mounted on the panel, wherein:

the panel has a mounting surface thereon, a first projecting part and a second projecting part which are separated by a predetermined distance, and the first projecting part and the second projecting part each has a bent part at leading edges thereof; and the board has a first open groove at a position opposite to the first projecting part and a second open groove at a position opposite to the second projecting part, the first open groove and the second open groove each have an arc shape with a narrow portion and an enlarged portion at an end portion of the arc shape, and the enlarged portions are inserted onto the first projecting part and the second projecting part; and after the first open groove and the second open groove are each received by the first projecting part and the second projecting part, the board is turned about the narrow portion within the mounting surface to make bottom surfaces of the bent parts of the first projecting part and the second projecting part come into contact with a top surface of the board to mount the board onto the panel; and the panel has a stopper rib for restricting the mounted board from turning backward.

2. The board mounting structure according to claim 1, wherein:

the board has a shape that rides up on the stopper rib when it is being turned about the narrow portion and rides over the stopper rib when the turning is completed, and a taper is formed on the bottom surfaces of the bent parts of the first projecting part and the second projecting part to allow the board to incline with respect to the mounting surface when the board gets on the stopper.

3. The board mounting structure according to claim 1, wherein the board mounts the parts near the narrow portion.

* * * * *